(12) United States Patent
Jabbarnezhad

(10) Patent No.: US 6,483,811 B1
(45) Date of Patent: Nov. 19, 2002

(54) SYSTEM AND METHOD FOR EMULATING A DISTRIBUTED NETWORK

(75) Inventor: Javid Jabbarnezhad, Parker, TX (US)

(73) Assignee: Electronic Data Systems Corporation, Plano, TX (US)

(*) Notice: Subject to any disclaimer, the term of this patent is extended or adjusted under 35 U.S.C. 154(b) by 0 days.

(21) Appl. No.: 09/129,201

(22) Filed: Aug. 4, 1998

(51) Int. Cl.[7] ............................... H04L 12/26; H04J 3/14
(52) U.S. Cl. ...................... 370/250; 370/352; 370/401; 370/409; 703/23; 709/249
(58) Field of Search ............................... 370/241, 250, 370/352, 353, 354, 389, 395, 400, 401, 409, 420; 703/13, 23; 709/223, 224, 225, 238, 249, 250

(56) References Cited

U.S. PATENT DOCUMENTS

| | | | |
|---|---|---|---|
| 5,600,644 A | | 2/1997 | Chang et al. ............... 370/404 |
| 5,600,798 A | | 2/1997 | Cherukuri et al. ..... 395/200.13 |
| 5,659,684 A | * | 8/1997 | Giovannoni et al. ..... 395/200.8 |
| 5,661,725 A | * | 8/1997 | Buck et al. .................. 370/377 |
| 5,734,654 A | | 3/1998 | Shirai et al. ................. 370/396 |
| 5,748,617 A | | 5/1998 | McLain, Jr. ................. 370/244 |
| 5,751,971 A | | 5/1998 | Dobbins et al. ........ 395/200.68 |
| 5,754,547 A | | 5/1998 | Nakazawa ................... 370/401 |
| 5,790,548 A | * | 8/1998 | Sistanizadeh et al. ....... 370/401 |
| 5,818,842 A | * | 10/1998 | Burwell et al. ............. 370/397 |
| 5,940,598 A | * | 8/1999 | Strauss et al. .......... 395/200.79 |
| 6,134,589 A | * | 10/2000 | Hultgren ..................... 709/227 |
| 6,172,981 B1 | * | 1/2001 | Cox et al. ................... 370/401 |

* cited by examiner

Primary Examiner—Alpus H. Hsu
(74) Attorney, Agent, or Firm—Baker Botts L.L.P.

(57) ABSTRACT

A system for emulating a distributed network includes a localized network operable to emulate a distributed network. A network device is coupled to the localized network and operable to be accessed over the localized network. A test site is operable to couple a test device to the localized network and to test the ability of the test device to access the network device over the localized network.

19 Claims, 3 Drawing Sheets

SYSTEM AND METHOD FOR EMULATING A DISTRIBUTED NETWORK

RELATED APPLICATIONS

This application is related to copending U.S. patent application Ser. No. 09/129,199 entitled "METHOD AND SYSTEM FOR AUTOMATIC LINE PROTECTION SWITCHING OF EMBEDDED CHANNELS," filed Aug. 4, 1998 by inventor, Javid (nmi) Jabbarnezhad and U.S. patent application Ser. No. 09/129,585 entitled "METHOD AND SYSTEM FOR REMOTE MANAGEMENT OF EQUIPMENT HAVING DUPLICATE NETWORK ADDRESSES," filed Aug. 4, 1998, by inventor Javid (nmi) Jabbarnezhad.

TECHNICAL FIELD OF THE INVENTION

This invention relates generally to the field of data communication networks, and more particularly to a system and method for emulating a distributed network.

BACKGROUND OF THE INVENTION

With the move toward decentralized processing, users have interconnected workstations, computers and other types of local equipment through local area networks (LANs). More recently, as users move toward global communications that allow equipment to appear as if it were attached to the local network, local area networks have been interconnected through wide area networks (WANs) such as the Internet.

A consequence of wide area networks is that network equipment needs to be able to communicate and provide services over the multiple interconnections of the wide area networks. Testing of network equipment for such operability is generally expensive due to the distributed nature of the wide area network and ineffective due to the inability to sufficiently control conditions on the wide area network. As a result, equipment is typically not fully tested or demonstrated prior to deployment. Instead, vendors engage customers in highly technical discussions to explain how equipment or services will operate. Such discussions are time consuming and expensive for vendors to staff conduct. In addition, without full testing, customers cannot be assured that the equipment will operate as promised or that services will provide a promised benefit.

SUMMARY OF THE INVENTION

In accordance with the present invention, a system and method for testing. equipment in a network environment are provided that substantially eliminate or reduce disadvantages or problems associated with previously developed systems and methods. In particular, the present invention provides a system and method for emulating a distributed network to allow full testing and demonstration of equipment in a network environment prior to deployment.

In one embodiment of the present invention, a system for emulating a distributed network includes a localized network operable to emulate a distributed network. A network device is coupled to the localized network and operable to be accessed over the localized network. A test site is operable to couple a test device to the localized network and to test the ability of the test device to access the network device over the localized network.

More specifically, in accordance with a particular embodiment of the present invention, the localized network includes a plurality of routers interconnected to each other to form disparate multiple-router transmission paths between the test site and the network device. The localized network may also include a telephony switch. In this embodiment, the test site is operable to couple the test device to the telephony switch and operable to test the ability of the test device to access the network device through the telephony switch. The network may be a frame relay network and the telephony switch a private branch exchange (PBX).

Technical advantages of the present invention include providing an improved system and method for testing equipment for a network environment. In particular, a localized network emulates a distributed network to allow functions and features of equipment to be fully tested and demonstrated. In addition, because a network is localized, the testing may be efficiently conducted in a production laboratory or other highly controlled environment.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
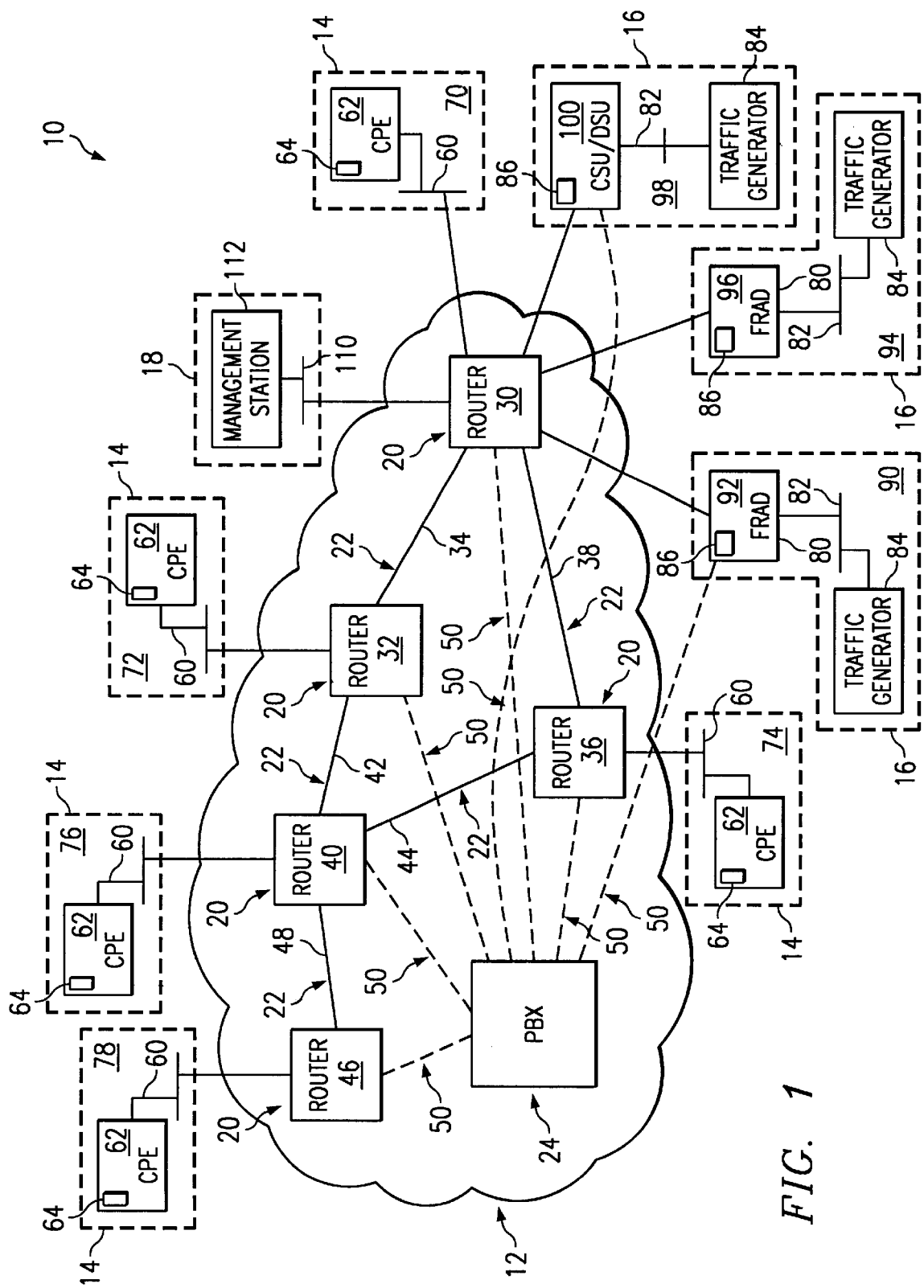
FIG. 1 is a schematic block diagram illustrating a production laboratory having a localized network for testing equipment in accordance with one embodiment of the present invention.

FIG. 1 illustrates a production laboratory 10 for testing equipment for a distributed network environment. Referring to FIG. 1, the production laboratory 10 includes a localized network 12, a plurality of device sites 14, a plurality of test sites 16, and a management site 18 each coupled to the localized network 12.

The network 12 is localized in that it is not geographically distributed. Preferably, the localized network 12 is contained at least substantially within a single complex, structure, facility, or space. This allows all equipment used in the testing process to be located at that single location and testing to be fully completed at that location. As a result, testing need not be coordinated between multiple locations which is both time consuming and costly.

The localized network 12 is preferably dedicated carrying test traffic and thus need not accommodate other nontest traffic. This allows conditions on the localized network 12 to be completely controlled and optimized for equipment testing.

The localized network 12 emulates a distributed network, such as a wide area network interconnecting geographically distributed local area networks. For the embodiment of FIG. 1, the localized network 12 is a frame relay network. The frame relay network uses a packet-switching protocol for connections between remote locations. The packets are in the form of frames which are variable in length. An advantage to the frame relay for a distributed network is that data packets of various sizes associated with virtually any native data protocol can be accommodated. As a result, the frame relay network is protocol independent because it does not undertake a lengthy protocol conversion process and offers fast and less expensive switching and/or routing.

The frame relay network includes a plurality of routers 20, a plurality of transmission links 22 interconnecting the routers 20, and a telephony switch 24. The routers 20 forward traffic according to network-level addresses, using information that the routers 20 exchange among themselves to find the best transmission path between network segments. In one embodiment, as described in more detail below, each transmission link 22 includes primary and secondary embedded channels defined in a network trunk. In this embodiment, the routers 20 provide automatic line protection switching between the primary and embedded channels. The network trunk may be a T1 line and the embedded channels may be private virtual channels (PVC).

The transmission links 22 interconnect the routers 20 to form a plurality of multiple-router transmission paths. The multiple-router transmission paths each route traffic through two or more routers 20 to provide multiple routes of a distributed network in the localized network 12. Provision of the plurality of such multiple-router transmission paths provide alternative paths of a distributed network in the localized network 12.

For the embodiment of FIG. 1, a first router 30 is connected to a second router 32 by a transmission link 34 and to a third router 36 by a transmission link 38. The second and third routers 32 and 36 are connected to a fourth router 40 by transmission links 42 and 44, respectively. A fifth router 46 is connected to the fourth router 40 by a transmission link 48. In this embodiment, for example, traffic may be routed from router 30 to router 40 via router 32 on transmission links 34 and 42 or may alternatively be routed via router 36 on transmission links 38 and 44.

The telephony switch 24 is connected to the routers 20 and select test sites 16 through telephony links 50. For the embodiment of FIG. 1, the telephony switch 24 is a private branch exchange (PBX) and the telephony links 50 are twisted pair lines. Inclusion of the PBX or other telephone switch 24 allows the localized network 12 to test equipment for applications in which the equipment is connected to a distributed network through a telephony switch, a distributed network utilizes a telephony switch for back-up communications, and telephony traffic is switched to a wide area network for reduced transmission costs.

The device sites 14 each include a local area network 60 and one or more network devices 62. The local area network connects the network devices 62 to a router 20 of the localized network 12. The local area network 60 may be an Ethernet or other suitable type of local network.

The network devices 62 are used in the production lab 10 to test the ability of test devices installed at the test sites 16 to access equipment over the localized network 12. The network devices 62 are customer premise equipment (CPE) or other types of equipment capable of being accessed over the localized network 12. The network devices 62 each include a network address 64 with which the device 62 can be accessed. In one embodiment, the network address 64 is an Internet Protocol (IP) address. The Internet Protocol address is a 32-bit address that includes a network portion and a host portion for efficient routing.

For the embodiment of FIG. 1, a first device site 70 is connected to the first router 30, a second device site 72 is connected to the second router 32, a third device site 74 is connected to the third router 36, a fourth device site 76 is connected to the fourth router 40 and a fifth device site 78 is connected to the fifth router 46. This multiplicity of device sites 14 allows equipment to be tested for operability with disparate types of network devices 62 at disparate points of the localized network 12.

The test sites 16 each include a test device 80, a local area network 82, and a traffic generator 84. The test device 80 is a device being tested for deployment in a distributed network. The test device 80 may be a router, a communications service unit, a data service unit, or other type of device designed for deployment in a network environment.

The local area network may be an Ethernet or other suitable type of local network. The traffic generator 84 provides traffic addressed to the network devices 62 to the test devices 80 in order to test the ability of the test devices 80 to access the network devices 62 over the localized network 12. As previously discussed, the network devices 62 include a network address 64 with which the network devices 62 can be accessed by test devices 80.

The test devices 80 include a network address 86 to allow the test devices 80 to be accessed and configured by the management station 18. The network addresses 86 also allow the network devices 62 to respond to the test devices 80. In one embodiment, the network address 86 is an Internet Protocol (IP) address. The Internet Protocol address is a 32-bit address that includes a network portion and a host portion for efficient routing.

For the embodiment of FIG. 1, a first test site 90 connects a first test device 92 to the first router 30, a second test site 94 connects a second test device 96 to the first router 30, and a third test site 98 connects a third test device 100 to the first router 30. In this embodiment, the first test device 92 is a frame relay with router (FRAD) device, the second test device is another frame relay with router (FRAD) device and the third device is a communications service unit (CSU) or a data service unit (DSU). Accordingly, a plurality of disparate test devices 80 may be connected to the localized network 12 and simultaneously tested in connection with disparate types of network devices 62 using the production laboratory 10.

The management site 18 includes a local area network 110 and a management station 112. The local area network 110 connects the management station 112 to the localized network 12. The local area network 110 may be an Ethernet or other suitable local network.

The management station 112 is a workstation or other suitable device operable to configure the network devices 62 and the test devices 80 and to monitor the testing of features and functions of the test devices 80. Accordingly, the test devices 80 are connected, configured, tested and monitored at a single location. Moreover, the testing includes testing the ability of the test devices 80 to access the various types of network devices 62 through multiple route and alternate paths of the localized network 12 and through the telephony switch 24 initially or as a backup transmission path. Accordingly, the features and functions of the test devices 80 may be fully demonstrated and problems identified.

Figure 2:
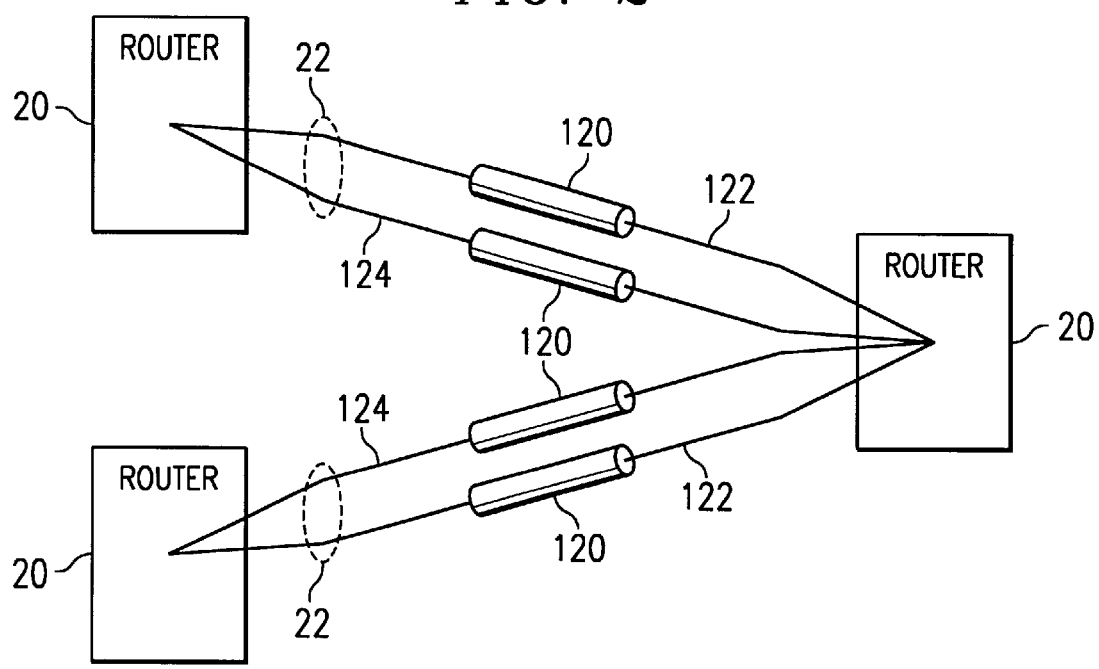
FIG. 2 is a schematic block diagram illustrating primary and secondary embedded channels for transmission links of the localized network of FIG. 1.

FIG. 2 illustrates details of the transmission links 22. The transmission links 22 are configured to match or simulate those of a distributed network. For the embodiment of FIG. 2, the transmission links 22 each include a pair of network trunks 120. A primary embedded channel 122 and a secondary embedded channel 124 are defined in each pair of network trunks 120. The network trunks 120 may be T1 lines and the embedded channels 122 and 124 may be private virtual channels (PVC). The private virtual channels 122 and 124 provide what appears to be dedicated lines without the cost associated with such lines. In accordance with private virtual channel standards, data is transmitted in accordance with backward and forward congestion protocols.

The primary private virtual channels 122 carry traffic between the test sites 16 and the device sites 14 in normal operation. The secondary private virtual channels 124 carry the traffic in the event of a fault condition on the primary embedded channels 122. Thus, in accordance with operations of a distributed network, communications are maintained in the localized network 12 even in the presence of a fault on a transmission link 22.

Figure 3:
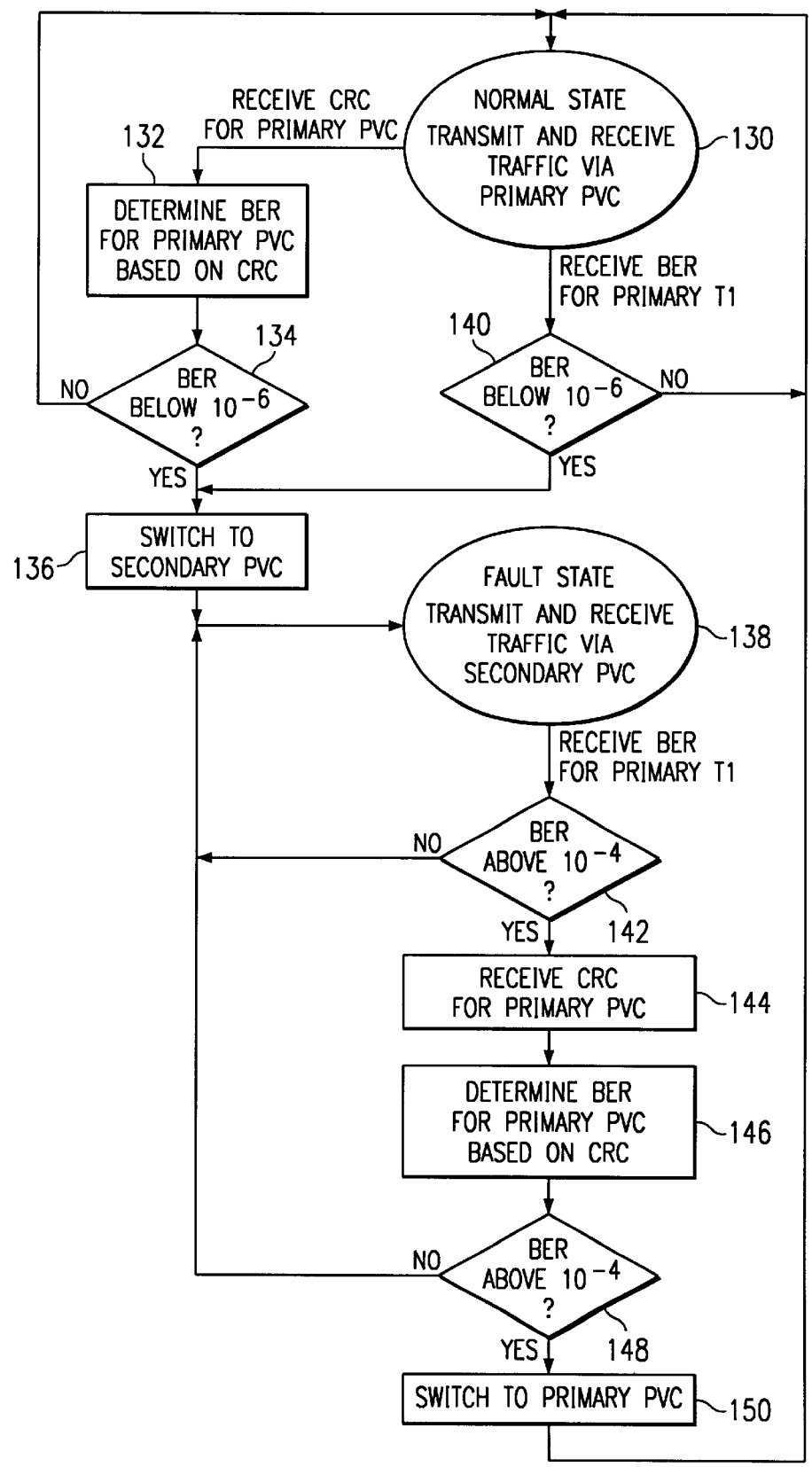
FIG. 3 is a flow diagram illustrating a method of automatic line protection switching between the primary and secondary embedded channels of the transmission links of FIG. 2.

FIG. 3 illustrates a method of automatic line protection switching between the primary and secondary private virtual channels 122 and 124 of the localized network 12. The automatic line protection switching preferably matches or simulates that of a distributed network. For the localized network 12, the method is independently conducted by the routers 20 at each end of the primary and secondary private virtual channels 122 and 124. As a result, the routers 20 independently switch between the primary and secondary private virtual channels 122 and 124 in unison and without the communication of private virtual channel fault messages.

Referring to FIG. 3, in a normal state 130 traffic is transmitted and received between transmit and receive routers 20 via the primary private virtual channel 122. In the normal state 130, each router 20 independently monitors a check sum value (CRC) of the primary private virtual channel 122. When a check sum value for the primary private virtual channel 122 is received, state 130 leads to step 132. At step 132, the router 20 determines a bit error rate (BER) for the primary private virtual channel 122 based on the check sum value for the channel 122. Next, at decisional step 134, the router 20 determines if the bit error rate is below $10^{-6}$. If the bit error rate is not below $10^{-6}$, then the NO branch of decisional step 134 returns to normal state 130. If the bit error rate is below $10^{-6}$, then a fault condition exists on the primary private virtual channel 122 and the YES branch of decisional step 134 leads to step 136. At step 136, the router 20 switches from the primary private virtual channel 122 to the secondary private virtual channel 124. Step 136 leads to fault state 138 in which traffic is transmitted and received via the secondary private virtual channel 124.

Returning to normal state 130, each router 20 also independently monitors the bit error rate of the network trunk 120. The bit error rate may be independently determined by each router 20 based on a check sum value or may be provided in accordance with trunk transmission protocol. In response to receiving the bit error rate of the network trunk 120, state 130 leads to decisional step 140. At decisional step 140, the router 20 determines if the bit error rate for the network trunk 120 is below $10^{-6}$. If the bit error rate is not below $10^{-6}$, the NO branch of decisional step 140 returns to normal state 130. If the bit error rate of the network trunk 120 is below $10^{-6}$, a fault condition exists on the network trunk 120 and the YES branch of decisional step 140 leads to step 136. At step 136, as previously described, the router 20 switches from the primary private virtual channel 122 to the secondary private virtual channel 124. Next, at the fault state 138, traffic is transmitted and received via the secondary private virtual channel 124.

In the default state 138, each router 20 continues to monitor the network trunk 120 and the primary private virtual channel 122 for a non fault condition. In response to receiving a bit error rate for the network trunk 120 carrying the primary private virtual channel 122, fault state 136 leads to decisional step 142. At decisional step 142, the router 20 determines if the bit error rate for the network trunk 120 is above $10^{-4}$. If the bit error rate is not above $10^{-4}$, then a fault condition continues to exist within the network trunk 120 and the NO branch of decisional step 142 returns to fault state 138. If the bit error rate of the network trunk 120 is above $10^{-4}$, then a non fault condition exits in the network trunk 120 and the YES branch of decisional branch 142 leads to step 144.

At step 144, the router 20 receives a check sum value for the primary private virtual channel 122. Proceeding to step 146, the router 20 determines the bit error rate for the primary private virtual channel 122 based on the check sum value. Next, at step 148, the router 20 determines if the bit error rate for the primary private virtual channel 122 is above $10^{-4}$. If the bit error rate for the primary private virtual channel 122 is not above $10^{-4}$, then a fault condition continues to exist in the primary private virtual channel 122 and the NO branch of decisional step 148 returns to the fault state 138. If the bit error rate of the primary private virtual channel 122 is above $10^{-4}$, then a non fault condition exists in the primary private virtual channel 122 and the YES branch of decisional step 148 leads to step 150. At step 150, the router 20 switches from the secondary primary private virtual channel 124 to the primary private virtual channel 122. Step 150 leads to normal state 130 in which traffic is transmitted and received on the primary private virtual channel 122.

Thus, each router independently and in unison switches between the primary and secondary private virtual channels 122 and 124 in response to the same fault and non fault conditions. The fault and non fault conditions may be any suitable condition of the network trunk and/or private virtual or other embedded channel that can be obtained or determined by the nodes. In this way, automatic line protection switching of a distributed network is provided for the localized network 12.

Although the present invention has been described with several embodiments, various changes and modifications may be suggested to one skilled in the art. It is intended that the present invention encompass such changes and modifications as fall within the scope of the appended claims.

What is claimed is:

1. A system for emulating a distributed network to allow testing of equipment in a network environment, the system comprising:

a localized network operable to emulate a distributed network;

a network device coupled to the localized network, the network device operable to be accessed over the localized network; and a test site coupled to the localized network, the test site operable to couple a test device to the localized network and to test the ability of the test device to access the network device over the localized network, the test site including a traffic generator operable to generate traffic addressed to the network device.

2. The system of claim 1, wherein the test site is operable to provide the traffic to test the ability of the test device to access the network device over the localized network.

3. The system of claim 1, wherein the network device has a network address and the test device is operable to access the network device using the network address.

4. The system of claim 3, wherein the network address is an Internet Protocol (IP) address.

5. The system of claim 1, further comprising a management station connected to the localized network, the management station operable to monitor the ability of the test device to access the network device over the localized network.

6. The system of claim 1, further comprising a management station connected to the localized network, the management station operable to configure the test device using a network address of the test device.

7. The system of claim 6, wherein the network address is an Internet Protocol (IP) address.

8. The system of claim 1, wherein the localized network includes a plurality of routers interconnected to form disparate transmission paths between the test site and the network device.

9. The system of claim 1, wherein the localized network includes a plurality of routers interconnected to form at least one multiple-router transmission path between the test site and the network device.

10. The system of claim 1, wherein the localized network includes a plurality of routers interconnected to form disparate multiple-router transmission paths between the test site and the network device.

11. The system of claim 1, wherein the localized network is a frame relay network.

12. The system of claim 1, wherein the localized network includes a plurality of routers interconnected by transmission links and the test device accesses the network device through private virtual channels defined in the transmission links.

13. The system of claim 1, further comprising:

a plurality of network devices coupled to the localized network, the network devices each operable to be accessed over the localized network; and the test site operable to test the ability of the test device to access each of the network devices over the localized network.

14. The system of claim 13, wherein the test site is operable to provide traffic addressed to each of the network devices to the test device to test the ability of the test device to access each of the network devices over the localized network.

15. The system of claim 1, further comprising:

the localized network including a telephony switch; and the test site operable to couple the test device to the telephony switch and to test the ability of the test device to access the network device through the telephony switch.

16. The system of claim 15, wherein the telephony switch is a private branch exchange (PBX).

17. The system of claim 1, wherein the test device is a router.

18. A method for testing a device in a network environment, comprising:

forming a localized network emulating a distributed network by interconnecting a plurality of routers;

coupling a network device to the localized network;

coupling a test device to the localized network;

generating traffic addressed to the network device; and testing the ability of the test device to access the network device over the localized network.

19. The method of claim 18, further comprising:

providing the traffic to the test device to test the ability of the test device to access the network device over the localized network.

* * * * *